US006690536B1

United States Patent
Ryan

(10) Patent No.: US 6,690,536 B1
(45) Date of Patent: Feb. 10, 2004

(54) DISK DRIVE EMPLOYING VCM DEMAND CURRENT TO CALIBRATE VCM IR VOLTAGE FOR VELOCITY CONTROL OF AN ACTUATOR ARM

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 386 days.

(21) Appl. No.: 09/704,175

(22) Filed: Oct. 31, 2000

(51) Int. Cl.[7] .............................................. G11B 5/596
(52) U.S. Cl. .................................................. 360/78.04
(58) Field of Search ........................ 360/75, 69, 78.09, 360/78.12; 318/615

(56) References Cited

U.S. PATENT DOCUMENTS

| 5,781,363 | A | * | 7/1998 | Rowan et al. | 360/78.09 |
| 5,982,130 | A | * | 11/1999 | Male | 318/615 |
| 6,021,015 | A | * | 2/2000 | Jeffrey et al. | 360/69 |
| 6,163,430 | A | * | 12/2000 | Hansen | 360/78.06 |

* cited by examiner

Primary Examiner—David Hudspeth
Assistant Examiner—K. Wong
(74) Attorney, Agent, or Firm—Milad G. Shara, Esq.; Howard H. Sheerin, Esq.

(57) ABSTRACT

A disk drive is disclosed comprising a disk, a head, an actuator arm for actuating the head radially over the disk, a fixed object, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A voltage calibrator, responsive to the current I detected by the current detector, calibrates the IR voltage detector by generating a calibration command input applied to the control voltage generator to move the actuator arm until it presses against the fixed object. The IR voltage detector is programmed to detect an initial IR voltage, and then adjusted to incrementally change the detected IR voltage until the current I detected by the current detector reaches a predetermined level.

12 Claims, 3 Drawing Sheets

DISK DRIVE EMPLOYING VCM DEMAND CURRENT TO CALIBRATE VCM IR VOLTAGE FOR VELOCITY CONTROL OF AN ACTUATOR ARM

CROSS REFERENCE TO RELATED APPLICATIONS AND PATENTS

This application is related to patent application Ser. No. 09/704,195 entitled "DISK DRIVE EMPLOYING SEEK TIME VCM IR VOLTAGE CALIBRATION FOR VELOCITY CONTROL OF AN ACTUATOR ARM", and Ser. No. 09/703,689 entitled "DISK DRIVE COMPRISING VCM STALL DETECTOR FOR VELOCITY CONTROL OF ACTUATOR ARM", both filed concurrently with the present application, the disclosures of which are incorporated herein by reference.

BACKGROUND OF THE INVENTION

1. Field of the Invention

The present invention relates to disk drives for computer systems. More particularly, the present invention relates to a disk drive employing VCM demand current to calibrate VCM IR voltage for velocity control of an actuator arm.

2. Description of the Prior Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives wherein the head is parked on a landing-zone of the disk, it is desirable to control the velocity of the actuator arm to unlatch the head during spin-up. In disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF generated by the VCM as the feedback. The VCM is essentially an RLC circuit where R is resistance, L inductance, and C the inertia of the motor and load. The voltage contribution of C to the measured back EMF is proportional to the velocity of the VCM. Since the resistance R is in series with C, it is desirable to cancel R's contribution to the back EMF leaving only LC. Once the resistance R is canceled, at low frequencies Ldi/dt is small leaving the voltage contribution of C as the dominant factor in the measured back EMF.

Prior art techniques for performing VCM resistance compensation include calibrating and subtracting from the measured back EMF the voltage contribution of R (i.e., the IR voltage where I is the current in the VCM). The VCM resistance R is measured by applying a fixed current to the VCM in order to press the actuator arm against a fixed object (e.g., the crash-stop for stopping the head at the inner diameter (ID) or the outer diameter (OD)). With the actuator arm pressed against the fixed object, the velocity is zero and Ldi/dt is zero, leaving the VCM resistance R as the only contribution to the measured back EMF.

If the IR voltage is completely canceled from the measured back EMF, it would result in an under-damped or unstable system. Thus, it is desirable to decrease the measured VCM resistance R by a small offset to leave a relatively small amount of IR voltage in the measured back EMF. In the past, the appropriate offset has been determined analytically by analyzing the deterministic characteristics of the VCM circuitry for a family of disk drives. This characterization can be difficult, and the nominal offset selected must account for the worst case disk drives on both ends of the spectrum. An offset which is too small can lead to instability in some disk drives, and an offset which is too large can lead to poor and possibly faulty performance in other disk drives. This problem is alleviated by using higher performance VCMs (e.g., VCMs with a higher Km and tighter tolerances); however, this increases the cost of the disk drive.

There is, therefore, a need to reduce the cost of a disk drive by employing a less expensive VCM wherein the VCM IR voltage can be accurately calibrated to enable velocity control of an actuator arm when embedded servo information is unavailable.

SUMMARY OF THE INVENTION

The present invention may be regarded as a disk drive comprising a disk, a head, an actuator arm for actuating the head radially over the disk, a fixed object, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A voltage calibrator, responsive to the current I detected by the current detector, calibrates the IR voltage detector by generating a calibration command input applied to the control voltage generator to move the actuator arm until it presses against the fixed object. The IR voltage detector is programmed to detect an initial IR voltage, and then adjusted to incrementally change the detected IR voltage until the current I detected by the current detector reaches a predetermined level.

In one embodiment, the initial IR voltage is a low value and the detected IR voltage is incrementally increased. In another embodiment, the initial IR voltage is a high value and the detected IR voltage is incrementally decreased. In yet another embodiment, the IR voltage detector comprises an amplifier. In still another embodiment, the current detector comprises a sense resistor in series with the coil. The present invention may also be regarded as a method of controlling velocity of an actuator arm in a disk drive. The disk drive comprises a disk, a head, the actuator arm, a fixed object, and a voice coil motor (VCM) for rotating the actuator arm about a pivot. The VCM comprises a coil comprising a VCM resistance R. A control voltage is generated from a calibration command input and a detected IR voltage. The control voltage is applied to the coil to generate a current I flowing through the coil to move the actuator arm until it presses against the fixed object. A current I flowing through the coil and the IR voltage proportional to the current I times the VCM resistance R are detected. The detected IR voltage is incrementally changed until the detected current I reaches a predetermined level.

DESCRIPTION OF THE PREFERRED EMBODIMENTS

Figure 1:
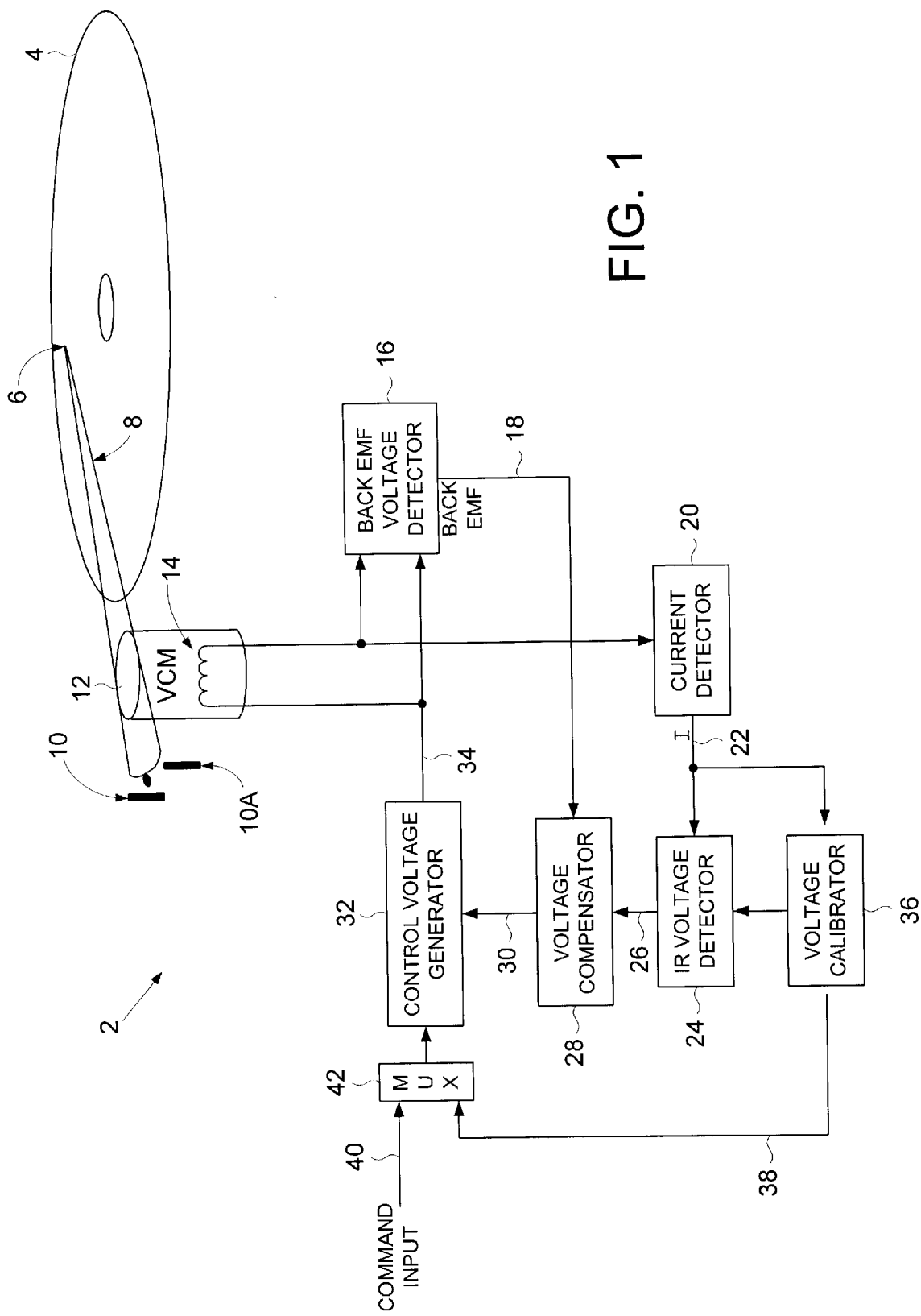
FIG. 1 shows a disk drive according to an embodiment of the present invention as comprising a back EMF voltage detector, an IR voltage detector, a voltage calibrator for calibrating the IR voltage detector, and a voltage compensator for substantially canceling the IR voltage from the back EMF voltage measurement.

FIG. 1 shows a disk drive 2 according to an embodiment of the present invention as comprising a disk 4, a head 6, an actuator arm 8 for actuating the head 6 radially over the disk 2, a fixed object 10, and a voice coil motor (VCM) 12 for rotating the actuator arm 8 about a pivot, the VCM 12 comprising a coil 14 comprising a VCM resistance R. A back EMF voltage detector 16 measures a back EMF voltage 18 across the coil 14, and a current detector 20 detects a current I 22 flowing through the coil 14. An IR voltage detector 24, responsive to the current I 22 detected by the current detector 20, detects an IR voltage 26 proportional to the current I 22 times the VCM resistance R. A voltage compensator 28 substantially cancels the IR voltage 26 from the measured back EMF voltage 18 to generate a compensated back EMF voltage 30. A control voltage generator 32, responsive the compensated back EMF voltage 30, generates a control voltage 34 applied to the coil 14 to generate the current I 22 flowing through the coil 14. A voltage calibrator 36, responsive to the current I 22 detected by the current detector 20, calibrates the IR voltage detector 24 by generating a calibration command input 38 applied to the control voltage generator 32 to move the actuator arm 8 until it presses against the fixed object 10. The IR voltage detector 24 is programmed to detect an initial IR voltage, and then adjusted to incrementally change the detected IR voltage 26 until the current I 22 detected by the current detector 20 reaches a predetermined level.

In the embodiment of FIG. 1, a suitable fixed object 10 is the crash-stop 10 for stopping the head 6 at the inner diameter (ID) of the disk 4 which prevents the head 6 from contacting the spindle motor structure (not shown). Alternatively, a suitable fixed object is the crash-stop 10A which prevents the head 6 from falling off the edge of the disk 4. Also in the embodiment of FIG. 1, an operating command input 40 is multiplexed 42 into the control voltage generator 32 with the calibration command input 38 generated by the voltage calibrator 36. The operating command input 40 is generated by a servo control system (not shown) during normal operation. In another embodiment, the voltage calibrator 36 is integrated into the servo control system (e.g., through firmware) such that the operating command input 40 and calibration command input 38 are generated by the same entity.

Figure 2:
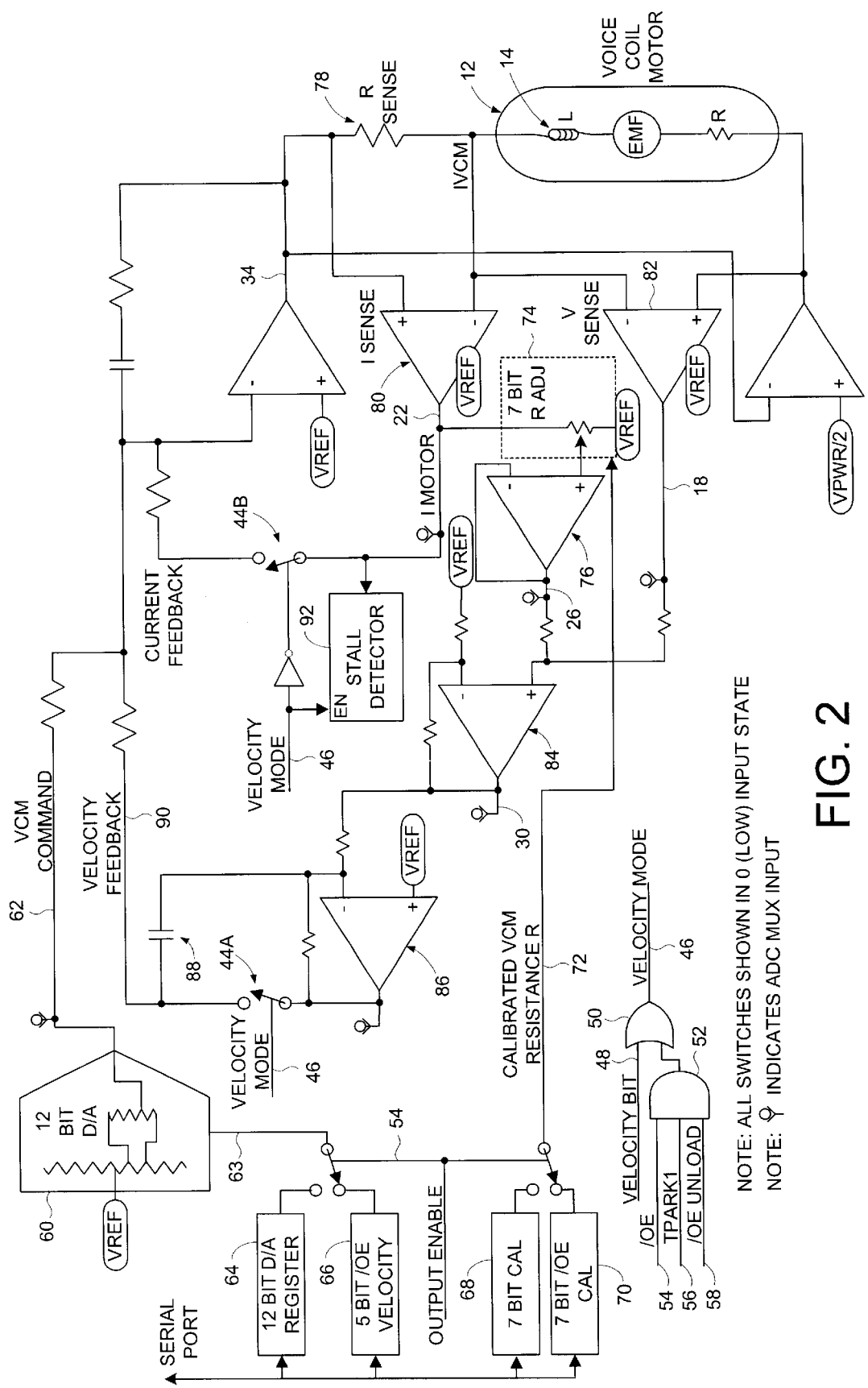
FIG. 2 shows suitable circuitry for implementing the components in the disk drive shown in FIG. 1.

FIG. 2 shows suitable circuitry for implementing the control voltage generator 32, back EMF voltage detector 16, current detector 20, IR voltage detector 24, and voltage compensator 28 of FIG. 1. Other circuitry, firmware, or combinations thereof may be employed in alternative embodiments. The circuit of FIG. 2 operates in a normal operating mode wherein the VCM 12 is driven by a current controlled feedback loop, and in a velocity control mode wherein the VCM 12 is driven by a voltage controlled feedback loop. When in the normal operating mode, switch 44A is opened and switched 44B is closed to configure the current feedback loop, and when in the velocity control mode, switch 44A is closed and switch 44B is opened to configure the voltage feedback loop. A velocity mode control signal 46 configures the switches 44A and 44B for velocity control mode when the embedded servo information is not available for servo controlling the velocity of the actuator arm 8. A velocity bit 48 may be set by a controller (e.g., a servo controller) to activate the velocity mode control signal 46 via OR gate 50. The velocity bit 48 may be set during controlled modes of operation, such as during a load/unload operation or when synchronization to the embedded servo data is lost. The velocity mode control signal 46 may also be activated via AND gate 52 and OR gate 50 during power down or power failure. If the OE UNLOAD signal 58 has been preset to configure the drive for velocity mode unload, when a power down or power failure is detected, the control signals OUTPUT ENABLE (OE) 54 and TPARK1 56 are automatically activated, thereby activating the velocity mode control signal 46.

A digital-to-analog (D/A) converter 60 generates an analog VCM command signal 62 in response to a digital command input signal 63. A digital register 64 is programmed with an operating command input 40 during normal operation, and with the calibration command input 38 when calibrating the IR voltage 26. A digital register 66 is programmed with a command input value used during power down or power failure to park the head 6. A digital register 68 stores a calibrated VCM resistance R value 72 for use during velocity control mode when the velocity bit 48 is activated (e.g., when calibrating the detected IR voltage 26). After calibrating the detected IR voltage 26 a digital register 70 stores the calibrated VCM resistance R value 72 for use during power down or power failure.

The VCM resistance R value 72 adjusts a programmable resistor 74 to vary a resistance associated with an input voltage to an amplifier 76. A sense resistor 78 and amplifier 80 implement a suitable current detector 20 for generating a voltage representing the current I 22 flowing through the coil 14. With the voltage representing the current I 22 applied to the programmable resistor 74, the output of amplifier 76 is the calibrated IR voltage 26. An amplifier 82 measures the back EMF voltage 18 across the coil 14. The IR voltage 26 is subtracted from the measured back EMF voltage 18 such that the output voltage of amplifier 84 is the compensated back EMF voltage 30. The compensated back EMF voltage 30 is amplified by amplifier 84, and filtered by amplifier 86 and capacitor 88 to generate a velocity feed back voltage 90 representative of the velocity of the actuator arm 8. The velocity feedback voltage 90 is subtracted from the VCM command signal 62 to generate the control voltage 34 applied to the coil 14.

A stall detector 92 monitors the current I 22 flowing through the coil 14 to detect when the VCM 12 has stalled.

For further details concerning the stall detector 92, see the above referenced patent application entitled "DISK DRIVE COMPRISING VCM STALL DETECTOR FOR VELOCITY CONTROL OF AN ACTUATOR ARM." In the present application, the stall detector 92 is also advantageously used to calibrate the IR voltage detector 24. The stall detector 92 is used to measure the current I 22 flowing through the coil 14, however, in an alternative embodiment the voltage representing the current I 22 may be measured directly using an analog-to-digital converter (not shown). The calibration process is understood with reference to the flow diagram shown in FIG. 3.

At step 94, a control voltage 34 is generated from a calibration command input 38 and a detected IR voltage 26. The control voltage 34 is applied to the coil 14 to generate a current I 22 flowing through the coil 14 to press the actuator arm 8 against a fixed object 10. In the embodiment of FIG. 2, the calibration command input 38 is set by programming register 64 with an appropriate digital value which is converted into a command voltage 62 by the D/A 60. The detected IR voltage 26 (generated by amplifier 76 in FIG. 2) is subtracted from the measured back EMF voltage 18 (generated by amplifier 82 in FIG. 2) to generate a compensated back EMF voltage 30 (feedback voltage 90 in FIG. 2). The compensated back EMF voltage 30 is subtracted from the command voltage 62 to generate the control voltage 34. At step 96, the control voltage 34 is applied to the coil 14 to generate a current I 22 flowing through the coil 14 to press the actuator arm 8 against a fixed object 10. At this point, the velocity of the actuator arm is zero such that the VCM resistance R is the only factor contributing to the measured back EMF voltage 18 (the voltage contribution from C is zero as well as the voltage contribution from Ldi/dt).

At step 98 the current I 22 flowing through the coil 14 is detected by the current detector 20 (e.g. by sense resistor 78 and amplifier 80 of FIG. 2) and compared to a predetermined level (e.g., by stall detector 92 of FIG. 2). If at step 100 the detected current I 22 equals the predetermined level, then the IR voltage detector 24 is calibrated correctly and the calibration process terminates. If at step 100 the detected current I 22 does not equal the predetermined level, at step 102 the IR voltage 26 is detected proportional to the current I 22 times the VCM resistance R. At step 104 the detected IR voltage 26 is incrementally changed and the process of FIG. 3 is re-iterated until the current I 22 reaches the predetermined level at step 100.

Figure 3:
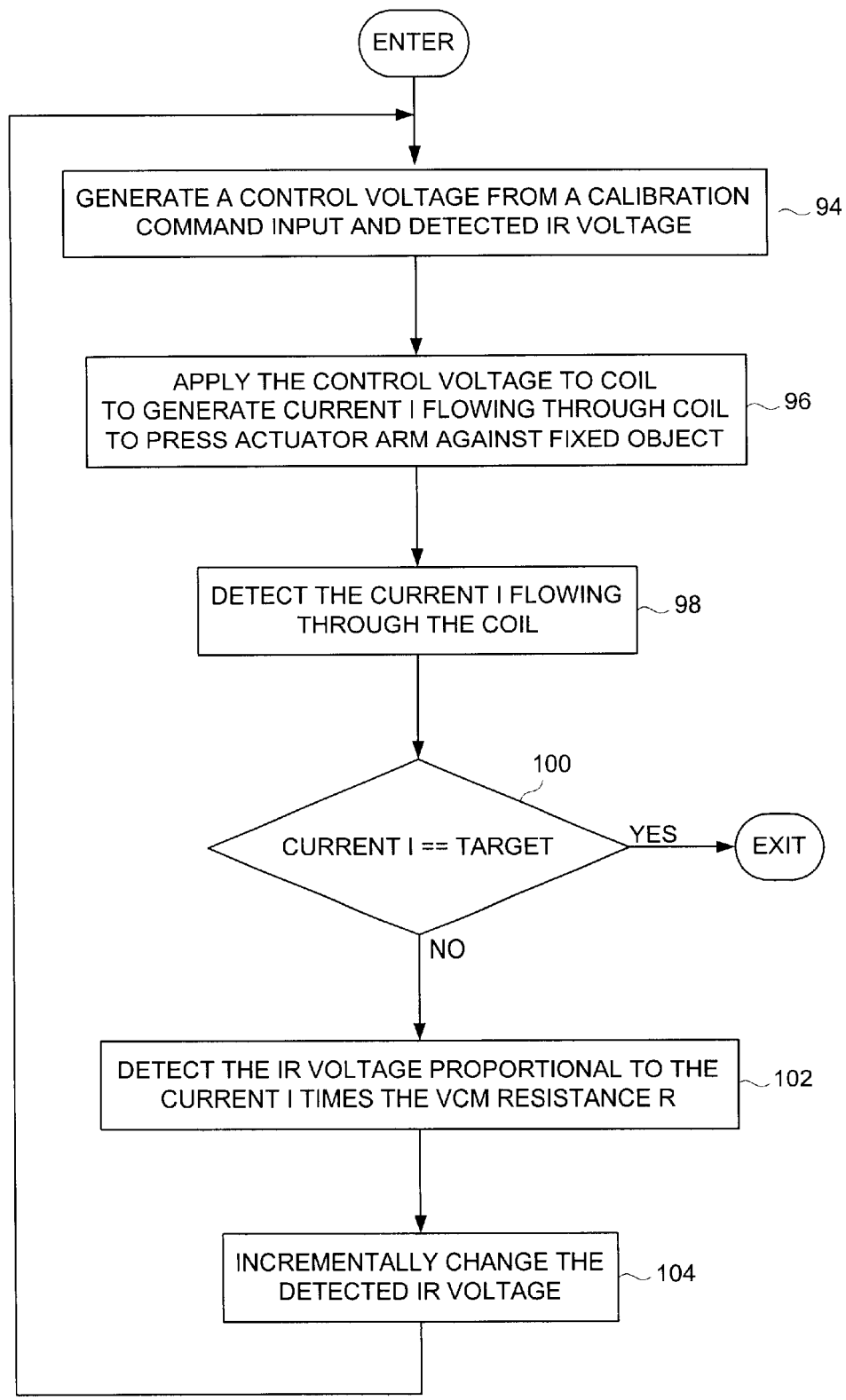
FIG. 3 is a flow diagram illustrating a method for controlling the velocity of the actuator arm according to an embodiment of the present invention.

The flow diagram of FIG. 3 is better understood by considering a specific example wherein the detected IR voltage 26 is incrementally changed until an effective one ohm of VCM resistance R remains in the compensated back EMF voltage 30. The calibration command input 38 is set to generate a command voltage 62 of ½ volt. The IR detector 24 is then incrementally changed (e.g., by programming register 68 to incrementally change the programmable resistor 74 of FIG. 2) until the current detector 20 detects ½ amp of current I 22 flowing through the coil 14. The calibrated VCM resistance R value stored in register 68 is then transferred to register 70 for use during power down or power failure. With an effective one ohm of VCM resistance R left in the compensated back EMF voltage 30, the system is over-damped and stable.

In one embodiment, the IR voltage detector 24 is programmed to detect an initial IR voltage 26 which is intentionally too high. The IR voltage detector 24 is then adjusted to incrementally decrease the detected IR voltage 26 until the current I 22 reaches the predetermined level. In another embodiment, the IR voltage detector 24 is programmed to detect an initial IR voltage 26 which is intentionally too low. The IR voltage detector 24 is then adjusted to incrementally increase the detected IR voltage 26 until the current I 22 reaches the predetermined level.

Calibrating the appropriate offset in the IR voltage detector 24 for each disk drive individually overcomes the problem inherent with the prior art technique of calibrating a nominal offset for a family of disk drives. Further, calibrating each disk drive individually may facilitate the use of less efficient voice coil motors with wider tolerances, thereby reducing the manufacturing cost of the disk drive.

I claim:

1. A disk drive comprising:
    (a) a disk;
    (b) a head;
    (c) an actuator arm for actuating the head radially over the disk;
    (d) a fixed object;
    (e) a voice coil motor (VCM) for rotating the actuator arm about a pivot, the VCM comprising a coil comprising a VCM resistance R;
    (f) a back EMF voltage detector for measuring a back EMF voltage across the coil;
    (g) a current detector for detecting a current I flowing through the coil;
    (h) an IR voltage detector, responsive to the current I detected by the current detector, for detecting an IR voltage proportional to the current I times the VCM resistance R;
    (i) a voltage compensator for substantially canceling the IR voltage from the measured back EMF voltage to generate a compensated back EMF voltage;
    (j) a control voltage generator, responsive the compensated back EMF voltage, for generating a control voltage applied to the coil to generate the current I flowing through the coil; and
    (k) a voltage calibrator, responsive to the current I detected by the current detector, for calibrating the IR voltage detector by:
        generating a calibration command input applied to the control voltage generator to move the actuator arm until it presses against the fixed object;
        programming the IR voltage detector to detect an initial IR voltage; and
        adjusting the IR voltage detector to incrementally change the detected IR voltage until the current I detected by the current detector reaches a predetermined level.

2. The disk drive as recited in claim 1, wherein
    (a) the initial IR voltage is a low value; and
    (b) the detected IR voltage is incrementally increased.

3. The disk drive as recited in claim 1, wherein
    (a) the initial IR voltage is a high value; and
    (b) the detected IR voltage is incrementally decreased.

4. The disk drive as recited in claim 1, wherein the IR voltage detector comprises an amplifier.

5. The disk drive as recited in claim 1, wherein the current detector comprises a sense resistor in series with the coil.

6. The disk drive as recited in claim 1, wherein the voltage calibrator comprises:
    (a) a first register for storing a calibrated VCM resistance value while calibrating the IR voltage detector; and
    (b) a second register for storing the calibrated VCM resistance value during normal operation of the disk drive.

7. A method of controlling velocity of an actuator arm in a disk drive, the disk drive comprising a disk, a head, the actuator arm, a fixed object, and a voice coil motor (VCM) for rotating the actuator arm about a pivot, the VCM comprising a coil comprising a VCM resistance R, the method comprising the steps of:

(a) generating a control voltage from a calibration command input and a detected IR voltage;

(b) applying the control voltage to the coil to generate a current I flowing through the coil to move the actuator arm until it presses against the fixed object;

(c) detecting the current I flowing through the coil;

(d) detecting the IR voltage proportional to the current I times the VCM resistance R;

(e) incrementally changing the detected IR voltage until the detected current I reaches a predetermined level.

8. The method of controlling velocity of an actuator arm as recited in claim 7, wherein the step of incrementally changing the detected IR voltage comprises the step of incrementally increasing the detected IR voltage.

9. The method of controlling velocity of an actuator arm as recited in claim 7, wherein the step of incrementally changing the detected IR voltage comprises the step of incrementally decreasing the detected IR voltage.

10. The method of controlling velocity of an actuator arm as recited in claim 7, wherein the step of adjusting the detected IR voltage comprises the step of adjusting a gain of an amplifier.

11. The method of controlling velocity of an actuator arm as recited in claim 7, wherein the step of detecting the current I flowing through the coil comprises the step of detecting a current flowing through a sense resistor in series with the coil.

12. The method of controlling velocity of an actuator arm as recited in claim 7, further comprising the steps of:

(a) storing a calibrated VCM resistance value in a first register while incrementally changing the detected IR voltage; and (b) storing the calibrated VCM resistance value in a second register once the detected current I reaches the predetermined level.

* * * * *